March 24, 1936.  H. E. CUMMINGS  2,035,299

MUD HOOK FOR MOTOR VEHICLE TIRES

Filed May 31, 1934

INVENTOR,
Harry E. Cummings.
BY Henry L. Chenery
Atty.

Patented Mar. 24, 1936

2,035,299

UNITED STATES PATENT OFFICE 2,035,299

MUD-HOOK FOR MOTOR VEHICLE TIRES

Harry E. Cummings, Portland, Maine

Application May 31, 1934, Serial No. 728,276

2 Claims. (Cl. 152—14)

This invention relates to motor vehicle tire equipment, dealing more particularly with a device commercially known as a mud-hook, the object of which, when bound around a tire, being to give tractional power to the vehicle wheel as it revolves on a slippery surface or is mired in soft road surfaces or snow.

Until comparatively recent times wheel traction devices were largely of the type employing circumferential side chains interconnected by cross-chains placed at quite close intervals around the tire tread. These chains, although yet extensively used, are rapidly being replaced by the less costly and more conveniently attached mud-hooks, various designs of which are now on the market.

One advantage of the mud-hook over the conventional type of tire chain resides in their ability to be mounted on the tire without moving the vehicle. Another appealing feature is that it is never necessary to mount more than three of these mud-hooks on a tire, and often it has been found that but one of them will serve the purpose of extricating a motorist from a situation in which bare tires will be useless.

In the conception of my present invention I have sought to provide a quickly attachable traction unit, easily and securely locked and rigidly held against transverse movement on the tire. The tread portion of the mud-hook is so constructed that ample tractional power is available and side slipping or skidding largely prevented.

In the accompanying drawing I have illustrated an embodiment which, at the present time, I consider preferable to other possible forms in which the invention might be carried out.

In the drawing,—

Similar reference characters are employed to identify like parts in all the different views of the drawing.

Figure 1:
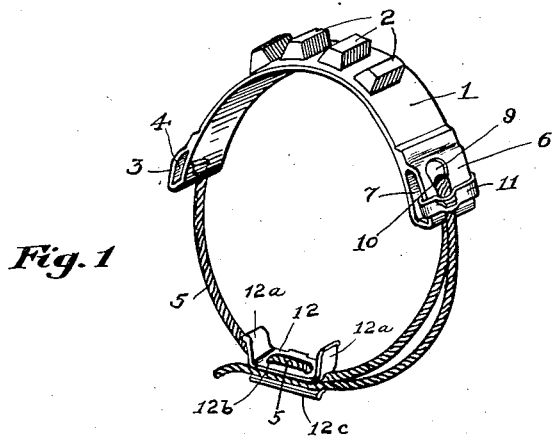
Fig. 1 is a perspective view of my improved mud-hook device.

In the drawing, 1 is a band made preferably of hard, tough metal, and 2 are the lugs which serve as the traction and side skidding elements and made from a metal or composition of metals insuring lasting qualities with respect to wear. These lugs, preferably are hardened, and spot welded to the band 1.

One end 3 of the band is bent upon itself and welded to the main portion of the band, forming a space 4.

Within the space 4 one end of the cable 5 is secured. This cable is made of stranded wire of small calibre, and extremely flexible so that it will bend easily.

The opposite end 6 of the band is also looped and similarly welded to the main portion of the band, and through the extreme end of the looped portion, opening out of the space 7 is a hole 8 for admission of the cable. The outer wall of this last mentioned loop is perforated by a hole 9 which terminates in a V-shape slot 10.

Figure 2:
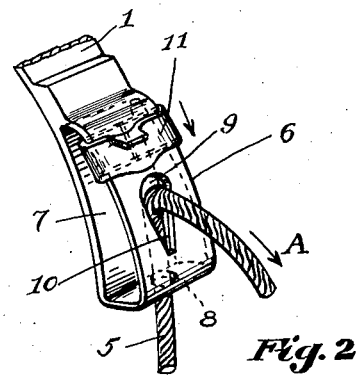
Fig. 2 is a perspective view of one end of the main element of the device.
Figure 4:
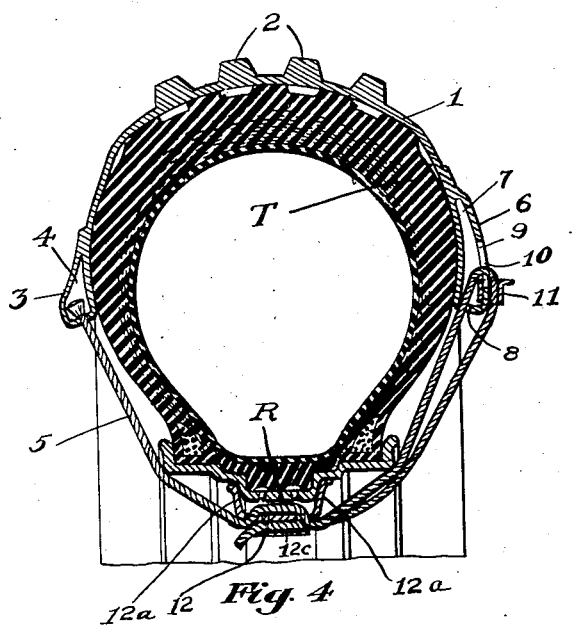
Fig. 4 is a transverse sectional elevation of the complete assembly of parts, mounted on a vehicle tire.

The cable, after passing through the hole 8 continues through the hole 9 (see Fig. 2) and by giving it a quick pull, in the direction of the arrow A, it becomes frictionally bound in the tapering slot 10.

To insure against accidental displacement of the cable from its secured position in the tapering slot, I provide a flat ring 11 which slides over and rigidly clamps the cable against the side 6 of the band.

In securing any traction-acquiring attachments to a tire it is essential that means be provided to prevent rotation of the part on and transversely of the tire.

I have accomplished this, in the present instance, by supplying a channel-shape locator 12, the sides 12a of which engage the inwardly disposed portion of the rim R of the wheel, W.

Figure 3:
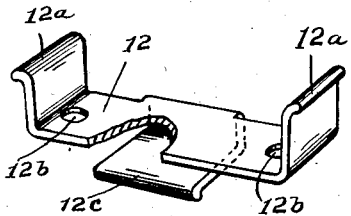
Fig. 3 is a perspective view of another part of the apparatus.
Figure 5:
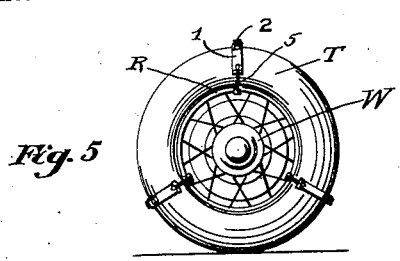
Fig. 5 is a side view of a tire and wheel with three of the devices mounted thereon.

It will be observed, by reference to Fig. 3, that the member 12 has two holes 12b through which the cable is reeved in an irregular course, kinking it in such a manner that, when the cable is drawn taut, it is practically impossible to move the locator along the cable.

Beneath the base of the member 12 is a shelf 12c between which and the base the free end of the cable 5 may be conveniently housed.

The member 12 is positioned on the cable so that the lugs 2 are disposed transversely central of the tire tread; and when, on any particular size of tire and rim, this adjustment is once made, no further positioning of the locator member is necessary.

The attaching of my mud-hook to a tire, once the locator has been adjusted properly, becomes a simple matter.

The free end of the cable 5 is reeved through the openings 8 and 9 of the looped portion 6, then brought tightly into the tapering slot 10 and clamped by the ring 11. The loose end of the cable is then tucked under the base of the locator and the vehicle is ready for locomotion with its wheels mud-hook equipped.

The advantages of my improved device reside in its simple construction, its quick attachability, its capacity for always remaining centralized on the tread of the tire, and its efficiency and practicability for forward tractional and anti-skid purposes.

What I claim is:

1. A mud-hook for vehicle tires comprising a band, a loop on one end of said band, a cable, one end of which is fixed in said loop, a loop on the opposite end of said band having an opening in its end wall, and another opening in its outer side wall terminating in a tapering slot, the free end of said cable adapted to be reeved through both of said openings and to be frictionally bound in said tapering slot, and a slidable ring clamp for securing the free end of said cable in closely abutting relation to said outer wall of the band loop.

2. A mud-hook for a motor vehicle tire, comprising a flat traction increasing band bent to conform to and adapted to be disposed on the tread and portions of the side walls of the tire, a loop on one end of said band made by bending the band upon itself, the lower end of the loop having a hole therein, a cord fixedly secured in the said hole, a loop on the opposite end of said band, said last mentioned loop having a hole in its extreme end through which said cord is reeved after encompassing the said rim, and a V-shaped slot in the outer wall of the loop last mentioned, into which the cord is jammed and reversely turned to frictionally secure it therein.

HARRY E. CUMMINGS.